United States Patent
Cao

(10) Patent No.: US 12,513,529 B2
(45) Date of Patent: Dec. 30, 2025

(54) 4G/5G DYNAMIC SPECTRUM SHARING (DSS) ANALYSIS

(71) Applicant: Parallel Wireless, Inc., Nashua, NH (US)

(72) Inventor: Yang Cao, Westford, MA (US)

(73) Assignee: Parallel Wireless, Inc., Nashua, NH (US)

(*) Notice: Subject to any disclaimer, the term of this patent is extended or adjusted under 35 U.S.C. 154(b) by 193 days.

(21) Appl. No.: 17/526,248

(22) Filed: Nov. 15, 2021

(65) Prior Publication Data
US 2022/0159473 A1   May 19, 2022

Related U.S. Application Data

(60) Provisional application No. 63/113,249, filed on Nov. 13, 2020.

(51) Int. Cl.
| | |
|---|---|
| *H04W 16/14* | (2009.01) |
| *H04L 5/00* | (2006.01) |
| *H04W 4/06* | (2009.01) |
| *H04W 56/00* | (2009.01) |
| *H04W 72/12* | (2023.01) |

(52) U.S. Cl.
CPC ........... *H04W 16/14* (2013.01); *H04L 5/0048* (2013.01); *H04W 4/06* (2013.01); *H04W 56/001* (2013.01); *H04W 72/12* (2013.01)

(58) Field of Classification Search
CPC .............. H04W 76/14; H04W 72/0446; H04L 27/2656; H04B 7/18539
See application file for complete search history.

(56) References Cited

U.S. PATENT DOCUMENTS

| | | |
|---|---|---|
| 10,304,338 B1 | 5/2019 | Lau et al. |
| 2014/0133456 A1 | 5/2014 | Donepudi et al. |
| 2014/0349611 A1 | 11/2014 | Kant et al. |
| 2015/0055623 A1 | 2/2015 | Li et al. |
| 2017/0208474 A1 | 7/2017 | Mody et al. |

(Continued)

FOREIGN PATENT DOCUMENTS

WO   WO-2020210961 A1 * 10/2020   ....... H04L 27/26025

OTHER PUBLICATIONS

Roessler, A., et al.: "Online Spotlight: NR and LTE Coexistence Through Dynamic Spectrum Sharing", Microwave Journal, Dec. 12, 2019.

(Continued)

*Primary Examiner* — Yee F Lam
(74) *Attorney, Agent, or Firm* — Michael Y. Saji

(57) ABSTRACT

Systems, methods and computer software are disclosed for simultaneous Long Term Evolution (LTE) and New Radio (NR) Physical Resource Block (PRB) scheduling in a network. In one embodiment a method includes transmitting a NR synchronization signal via Multicast Broadcast Single Frequency Network (MBSFN); wherein the NR uses standard LTE subframes with Cell Reference Signal (CRS) rate-matching and additional Demodulation Reference Signal (DMRS) position; dynamically sharing a sub-frame between LTE and 5G NR; and scheduling simultaneous LIE and NR PRB within 1 ms granularity, implemented within a Virtual Baseband Unit (VBBU) facilitated via a Heterogeneous Network (HetNet) Gateway (HNG).

15 Claims, 6 Drawing Sheets

(56) References Cited

U.S. PATENT DOCUMENTS

| | | |
|---|---|---|
| 2017/0311217 A1 | 10/2017 | Jung et al. |
| 2018/0205507 A1* | 7/2018 | John Wilson ......... H04L 5/0051 |
| 2018/0248787 A1 | 8/2018 | Rajagopal et al. |
| 2018/0287760 A1* | 10/2018 | Choi ...................... H04J 11/005 |
| 2018/0302884 A1 | 10/2018 | Dong |
| 2019/0223088 A1 | 7/2019 | Pateromichelakis et al. |
| 2019/0254047 A1 | 8/2019 | Ahmed et al. |
| 2019/0260551 A1 | 8/2019 | Baldemair et al. |
| 2019/0289497 A1 | 9/2019 | Rajagopal |
| 2019/0363866 A1* | 11/2019 | Gaal ...................... H04L 1/1854 |
| 2020/0154496 A1* | 5/2020 | Yi .......................... H04W 76/15 |
| 2020/0162348 A1 | 5/2020 | Suthar et al. |
| 2020/0170022 A1* | 5/2020 | Jones ................ H04W 72/0446 |
| 2020/0170077 A1* | 5/2020 | Lee ....................... H04W 88/10 |
| 2020/0186315 A1* | 6/2020 | Li .......................... H04W 72/56 |
| 2020/0235788 A1 | 7/2020 | Rajagopal et al. |
| 2020/0382354 A1* | 12/2020 | Sengupta ................ H04L 5/001 |
| 2021/0014737 A1 | 1/2021 | Yang et al. |
| 2021/0058953 A1* | 2/2021 | Bendlin ................. H04W 16/14 |
| 2022/0039118 A1* | 2/2022 | Zhao .................... H04L 27/2607 |
| 2022/0141833 A1* | 5/2022 | Sharma ................. H04W 76/10 370/280 |
| 2022/0272701 A1* | 8/2022 | Hannan ................. H04W 16/02 |
| 2022/0394524 A1* | 12/2022 | Choi ................. H04W 72/0453 |

OTHER PUBLICATIONS

"NR/5G—Dynamic Spectrum Sharing—Programmer Sought", https://www.programmersought.com/article/83694160838/, Nov. 9, 2021.

5G; NR; User Equipment (UE) radio access capabilities (3GPP TS 38.306 version 15.3.0 Release 15), Oct. 2018.

Wan et al.: "Enabling Efficient 5G NR and 4G LTE Coexistence", Huawei Technologies Co., Ltd., IEEE Wireless Communication, Feb. 2019.

* cited by examiner

4G/5G DYNAMIC SPECTRUM SHARING (DSS) ANALYSIS

CROSS-REFERENCE TO RELATED APPLICATIONS

This application claims priority under 35 U.S.C. § 119(e) to U.S. Provisional Pat. App. No. 63/104,571, filed Oct. 23, 2020, titled "Diameter Charging-Rule Inheritance Support" which is hereby incorporated by reference in its entirety for all purposes. This application also hereby incorporates by reference, for all purposes, each of the following U.S. Patent App. Pub. Nos. US20110044285, US20140241316; WO Pat. App. Pub. No. Wo2013145592A1; EP Pat. App. Pub. No. EP2773151A1; U.S. Pat. No. 8,879,416, "Heterogeneous Mesh Network And Multi-Rat Node Used Therein," filed May 8, 2013; U.S. Pat. No. 8,867,418, "Methods Of Incorporating An Ad Hoc Cellular Network Into A Fixed Cellular Network," filed Feb. 18, 2014; U.S. patent Ser. No. 14/777,246, "Methods Of Enabling Base Station Functionality In A User Equipment," filed Sep. 15, 2016; U.S. patent Ser. No. 14/289,821, "Method Of Connecting Security Gateway To Mesh Network," filed May 29, 2014; U.S. patent Ser. No. 14/642,544, "Federated X2 Gateway," filed Mar. 9, 2015; U.S. patent Ser. No. 14/711,293, "Multi-Egress Backhaul," Filed May 13, 2015; U.S. Pat. No. 62/375,341, "S2 Proxy For Multi-Architecture Virtualization," filed Aug. 15, 2016; U.S. patent Ser. No. 15/132,229, "Maxmesh: Mesh Backhaul Routing," filed Apr. 18, 2016, each in its entirety for all purposes, respectively. This application also hereby incorporates by reference in their entirety each of the following U.S. Pat. Applications or Pat. App. Publications: US20150098387A1; US20170055186A1; US20170273134A1; US20170272330A1; and Ser. No. 15/713,584. This application also hereby incorporates by reference in their entirety U.S. patent Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

3GPP defined elements are used as is CRS rate matching of NR PDCCH. Defined in #GPP R15. Up to three different, non-overlapping CRS rate matching defined in 3GPP R16, allowing for wider NR spectrum. Goal: ensuring concurrent NR deployment can work around LIE CRS RES, hence no interference to the concurrent LIE. Limitation: limiting to NR NCS option to 15 Khz.

NR 7.5 Khz UL frequency shift. Objective: ensuring the UL subcarriers of NR and LIE remain orthogonal. NR DMRS can be deployed in symbol-12. New device capability (3GPP TS 38.211 v15.6.0 (2019 June)).

SUMMARY

A method, computer readable media, and a system is disclosed to provide 4G/5G dynamic spectrum sharing analysis. In one embodiment a method includes transmitting a NR synchronization signal via Multicast Broadcast Single Frequency Network (MBSFN); wherein the NR uses standard LTE subframes with Cell Reference Signal (CRS) rate-matching and additional Demodulation Reference Signal (DMRS) position; dynamically sharing a sub-frame between LTE and 5G NR; and scheduling simultaneous LTE and NR PRB within 1 ms granularity, implemented within a Virtual Baseband Unit (VBBU) facilitated via a Heterogeneous Network (HetNet) Gateway (HNG).

In another embodiment, a non-transitory computer-readable medium contains instructions for providing simultaneous Long Term Evolution (LTE) and New Radio (NR) Physical Resource Block (PRB) scheduling in a network which, when executed, cause a system to perform steps including transmitting a NR synchronization signal via Multicast Broadcast Single Frequency Network (MBSFN); wherein the NR uses standard LTE subframes with Cell Reference Signal (CRS) rate-matching and additional Demodulation Reference Signal (DMRS) position; dynamically sharing a sub-frame between LTE and 5G NR; and scheduling simultaneous LTE and NR PRB within 1 ms granularity, implemented within a Virtual Baseband Unit (VBBU) facilitated via a Heterogeneous Network (HetNet) Gateway (HNG).

In another embodiment, a system is disclosed for providing simultaneous Long Term Evolution (LTE) and New Radio (NR) Physical Resource Block (PRB) scheduling in a network. The system includes a network device transmitting a NR synchronization signal via Multicast Broadcast Single Frequency Network (MBSFN); wherein the NR uses standard LTE subframes with Cell Reference Signal (CRS) rate-matching and additional Demodulation Reference Signal (DMRS) position; the network device dynamically shares a sub-frame between LTE and 5G NR; and the network device schedules simultaneous LIE and NR PRB within 1 ms granularity, implemented within a Virtual Baseband Unit (VBBU) facilitated via a Heterogeneous Network (HetNet) Gateway (HNG).

DETAILED DESCRIPTION

All legacy LIE devices should be able to access the network for the deployment to be commercially sound. This implies it is not possible to change the LIE specifications for NR/NR should have a minimum impact on LIE latency, coverage and peak rate, at least when NR traffic load is low. It should be able to release as much of NR's full potential as possible when LIE traffic intensity is low. Fully dynamic—even the same sub-frame can be shared by both LIE and NR. Supporting both NSA and SA deployment mode. Avoiding expensive re-farming or static LIE/NR allocation.

Figure 1:
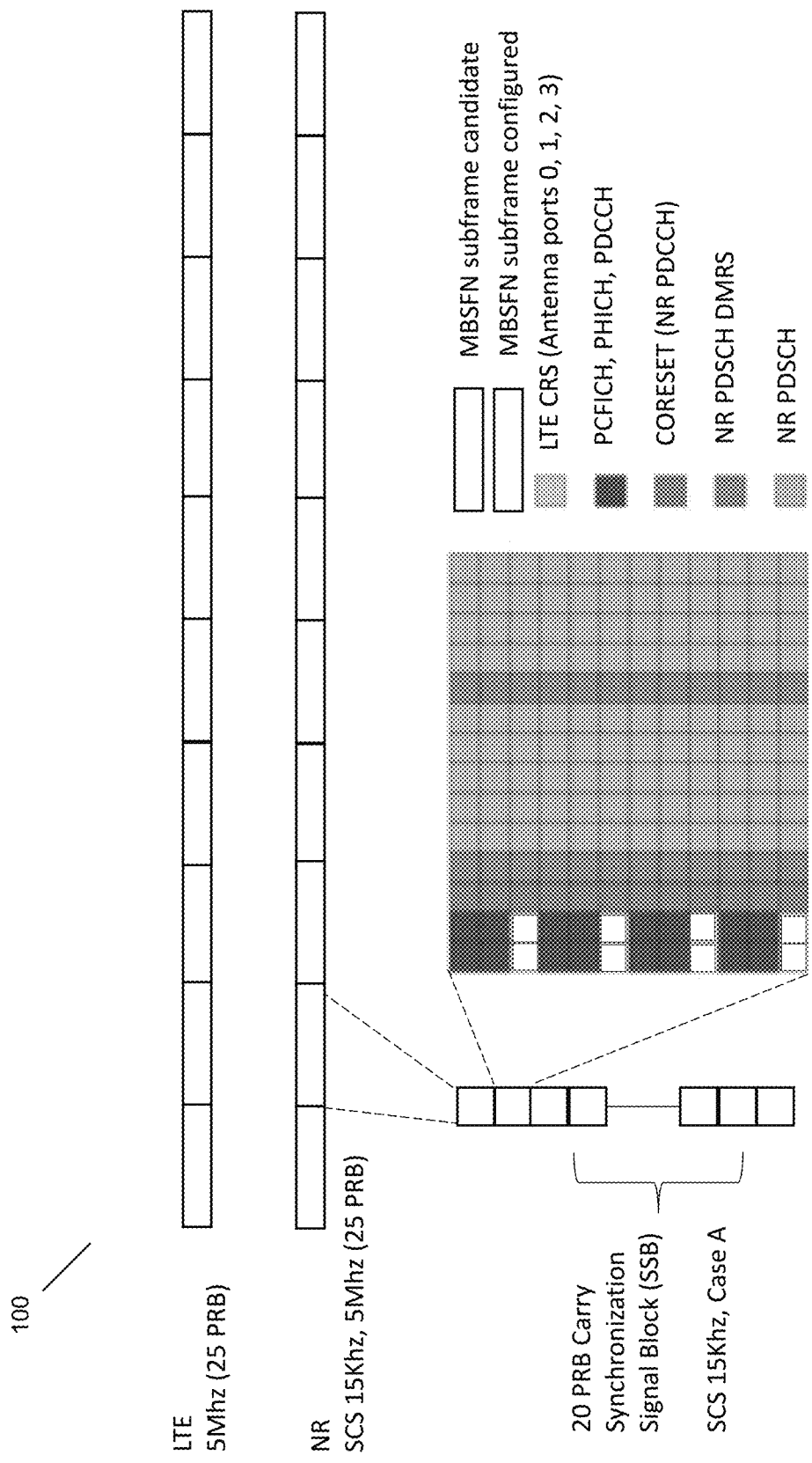
FIG. 1 is a diagram showing NR signal configuration within the MBSFN subframe, in accordance with some embodiments.

Simultaneous LIE and NR PRB scheduling within 1 ms granularity, implemented within our VBBU (facilitated via HNG). Guard-band can be added to support higher SCS than 15 khz FIG. 1 shows NR signal configuration 100 within the MBSFN subframe 100. DSS has an impact on both LTE and 5G NR standards. The effect on LTE is marginal, as it is hard to change a successfully deployed technology to enable its successor. A 5G NR device needs to detect the synchronization signal blocks (SSB) to access the network. To maintain synchronization in time and frequency, these SSBs need to be sent periodically by the network, with a gap defined to transmit the SSB on an already occupied frequency channel used by LTE. The ideal feature to allow this gap in a continuous LTE transmission is to use multimedia broadcast single frequency network (MBSFN) subframes.

In order to minimize the impact on the performance of LTE, typically only one subframe out of the six possible subframes is configured to be an MBSFN subframe. The applied configuration is broadcast by the LTE network with system information block type 2 (SIB2). This is the same SIB that informs a 5G-capable terminal that the LTE serving cell can connect the handset to the 5G RAN. A standard LTE terminal would read in the MBSFN configuration from SIB2 and ignore the subframes configured for broadcast. Initially, DSS is tested based on NSA mode; thus, the 5G handset would have two radios active, LTE and 5G NR.

The LTE portion will follow the same principles as an LTE-only device. However, the 5G NR part of the handset, scanning the targeted frequency band for sharing, will detect the transmitted SSB within the open LTE subframe on the desired frequency channel. As DSS is intended to provide a coverage layer for 5G, typically frequency bands below 1 GHz are shared between LTE and 5G NR.

Typically, the SSBs are transmitted by the network in the first half-frame (5 ms) of a radio frame. As it is not possible in LTE to configure subframe 0 for MBSFN, subframe 1 is configured as the MBSFN subframe, so it can carry SSBs. However, an MBSFN subframe is never entirely empty. There is a non-MBSFN region defined that can be one or two OFDM symbols long, dependent on overall signal bandwidth. This region is intended to carry the control channels for LTE, such as the physical hybrid ARQ channel, the physical control format indicator channel and the physical downlink control channel (PDCCH). Therefore, any NR transmission can only start at OFDM symbols 2 or 3 within an MBSFN subframe.

The requirement to transmit control information for NR, to schedule the reception of NR's physical data shared channel (PDSCH) and the necessity to map a demodulation reference signal for the data channel to the beginning of the subframes lead to the configuration illustrated in FIG. 1. Out of the total 14 OFDM symbols forming a subframe of 1 ms duration for subcarrier spacing of 15 kHz in one 5G NR slot, only 12 OFDM symbols are available for NR transmission. For proper demodulation of the PDSCH and to enable mobility, a second symbol carrying the PDSCH demodulation reference signal (DMRS) for the data channel is required. This additional symbol is symbol 9, as shown in FIG. 1.

To enable NR to use these subframes, rate-matching around LTE CRS is adopted by the standard. Several factors impact the rate-matching algorithm. The first parameter is required to align the subcarrier positioning for 5G NR related to LTE. The value corresponds to the offset to point A divided by 15 kHz. Second, the bandwidth and number of antenna ports used by LTE must be known, as the MIMO mode dictates the mapping of CRS per antenna port. DSS targets frequencies below 1 GHz; therefore, typically two antenna ports (2×2 MIMO) are used. Lastly, the factor vshift represents the impact of the physical cell identity (PCI; $v_{shift}$=PCI mod 6), which defines the starting point (subcarrier) for the mapping of the LTE sequence used for generating CRS. In a real network, this information is signaled to the device via the dedicated radio resource control (RRC) connection. As NSA mode is the initial deployment mode for DSS testing, this information is sent over the established LTE connection to the device. In SA mode, it would be sent over the NR RRC connection.

Figure 2:
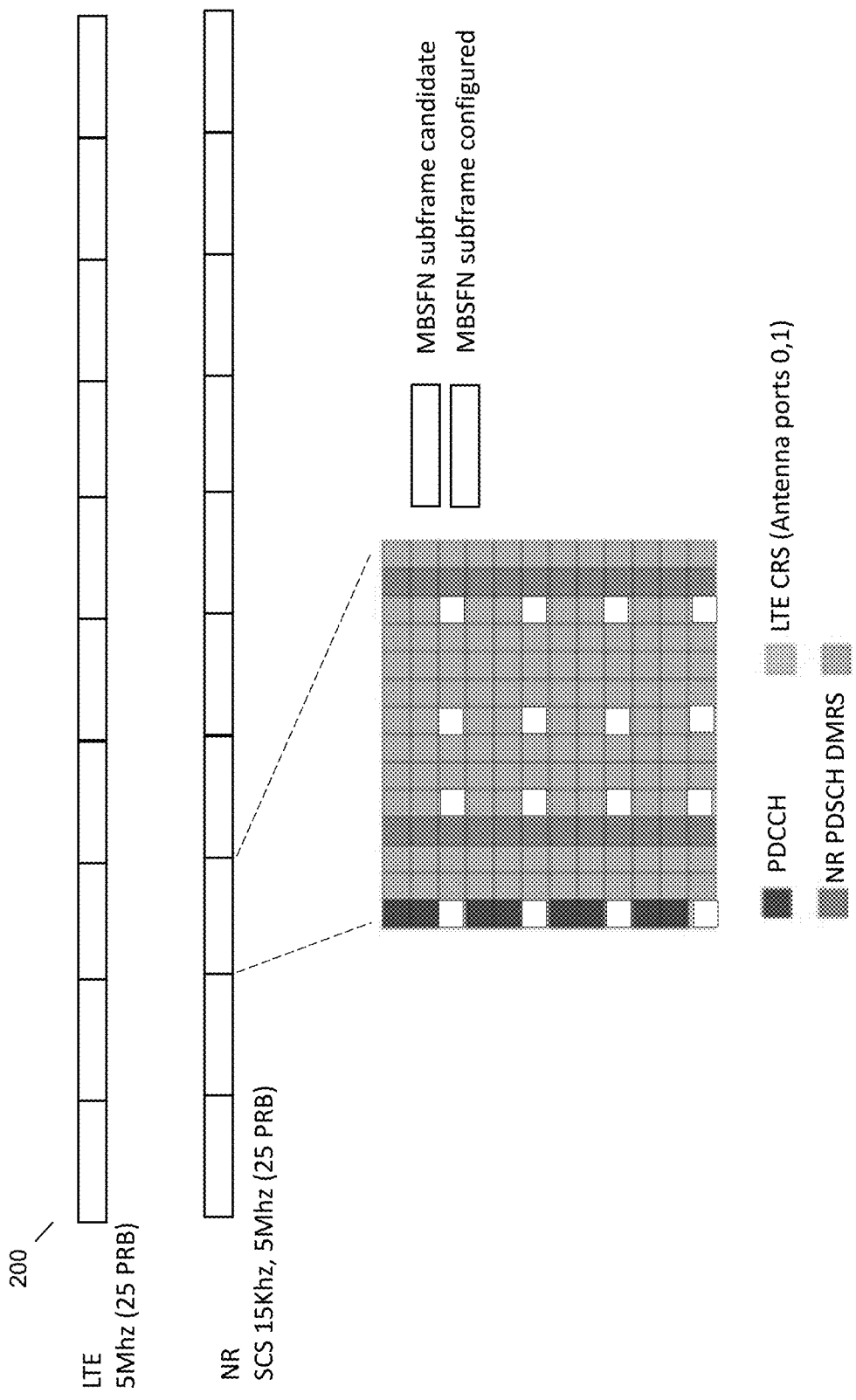
FIG. 2 is a diagram showing NR using standard LTE subframes with CRS rate-matching and additional DMRS position, in accordance with some embodiments.

FIG. 2 shows NR using standard LTE subframes with CRS rate-matching and additional DMRS position 200. A second feature is the support of an additional position for the mapping of the PDSCH DMRS. Based on a standard LTE subframe, with the LTE control channel and CRS present, and assuming the scheduler does not schedule any PDSCH, the remainder of the subframes are available to 5G NR. Therefore, the control resource set (CORESET) and the NR PDSCH with rate-matching active, including DMRS, are mapped on the available resource element (see the example in FIG. 2). Due to the CORESET occupying OFDM symbol 2, the first PDSCH DMRS is assigned to symbol 3. The position information (l0) of the OFDM symbol (2 or 3) that carries the first DMRS is indicated with the master information block carried by the physical broadcast channel as part of the SSB. To support mobility, proper channel estimation is a prerequisite that can only be guaranteed if at least two symbols within a slot carry PDSCH DMRS. According to 3GPP TS 38.211 V15.6.0 (2019 June), 3 for the provided example, this additional symbol to carry DMRS would be OFDM symbol 11. However, from an LTE perspective, CRS is still present and transmitted in this symbol; therefore, the additional position of the DMRS must move from symbol 11 to symbol 12 (see FIG. 2). This feature is a device capability, which means the device signals its support of this functionality to the network during the initial registration process.

Figure 3:
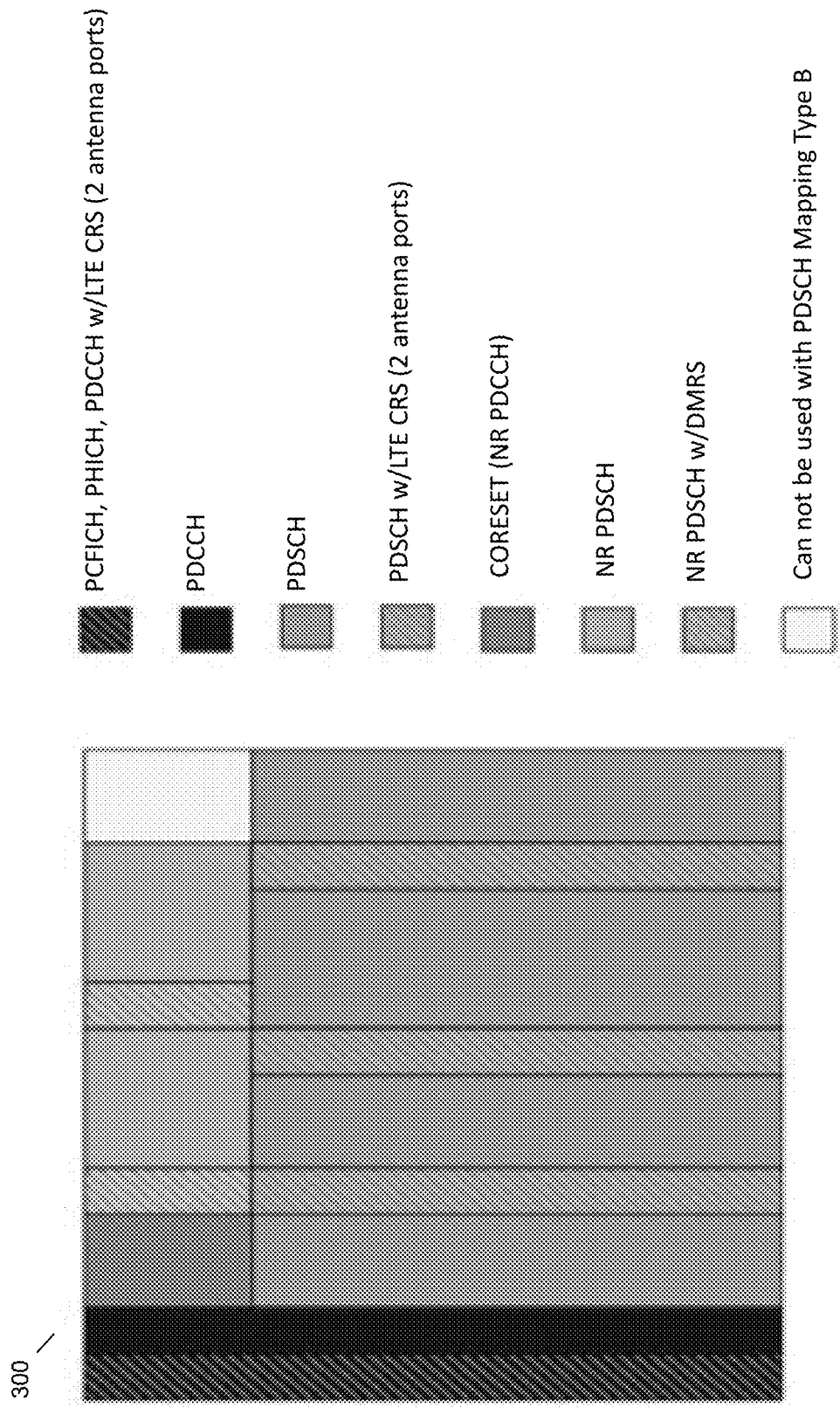
FIG. 3 is a diagram showing dynamic sharing of a subframe between LTE and 5G NR, in accordance with some embodiments.

FIG. 3 shows dynamic sharing of a subframe between LTE and 5G NR. In general, this change is only applicable if three conditions are fulfilled: First, the device needs to have submitted the support of the capability to the network; second, the network has configured the device with the rate-matching parameter for LTE CRS via RRC; third, the first position of the PDSCH DMRS is set to $l_0$=3.

Figure 4:
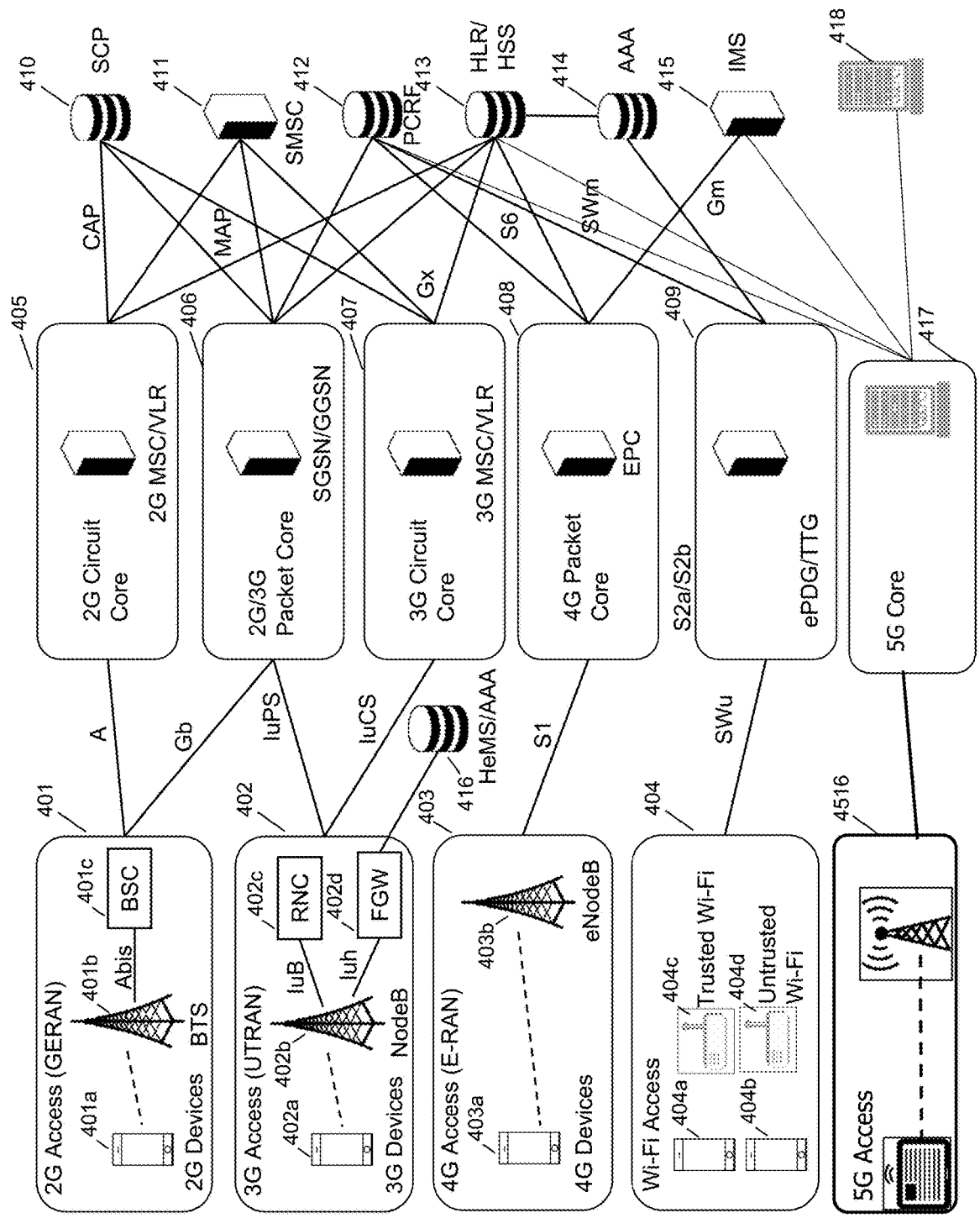
FIG. 4 is a schematic network architecture diagram for 3G and other-G prior art networks.

FIG. 4 is a schematic network architecture diagram for 3G and other-G prior art networks. The diagram shows a plurality of "Gs," including 2G, 3G, 4G, 5G and Wi-Fi. 2G is represented by GERAN 401, which includes a 2G device 401a, BTS 401b, and BSC 401c. 3G is represented by UTRAN 402, which includes a 3G UE 402a, nodeB 402b, RNC 402c, and femto gateway (FGW, which in 3GPP namespace is also known as a Home nodeB Gateway or HNBGW) 402d. 4G is represented by EUTRAN or E-RAN 403, which includes an LTE UE 403a and LTE eNodeB 403b. Wi-Fi is represented by Wi-Fi access network 404, which includes a trusted Wi-Fi access point 404c and an untrusted Wi-Fi access point 404d. The Wi-Fi devices 404a and 404b access either AP 404c or 404d. In the current network architecture, each "G" has a core network. 2G circuit core network 405 includes a 2G MSC/VLR; 2G/3G packet core network 406 includes an SGSN/GGSN (for EDGE or UMTS packet traffic); 3G circuit core 407 includes a 3G MSC/VLR; 4G circuit core 408 includes an evolved packet core (EPC); and in some embodiments the Wi-Fi access network is connected via an ePDG/TTG using S2a/S2b. Each of these nodes are connected via a number of different protocols and interfaces, as shown, to other, non-"G"-specific network nodes, such as the SCP 430, the SMSC 431, PCRF 432, HLR/HSS 433, Authentication, Authorization, and Accounting server (AAA) 434, and IP Multimedia Subsystem (IMS) 435. An HeMS/AAA 436 is present in some cases for use by the 3G UTRAN. The diagram is used to indicate schematically the basic functions of each network as known to one of skill in the art, and is not intended to be exhaustive. For example, 4G core 417 is shown using a single interface to 4G access 416, although in some cases 4G access can be supported using dual connectivity or via a non-standalone deployment architecture.

Noteworthy is that the RANs 401, 402, 403, 404 and 436 rely on specialized core networks 405, 406, 407, 408, 409, 437 but share essential management databases 430, 431, 432, 433, 434, 435, 438. More specifically, for the 2G GERAN, a BSC 401c is required for Abis compatibility with BTS 401b, while for the 3G UTRAN, an RNC 402c is required for Iub compatibility and an FGW 402d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 5:
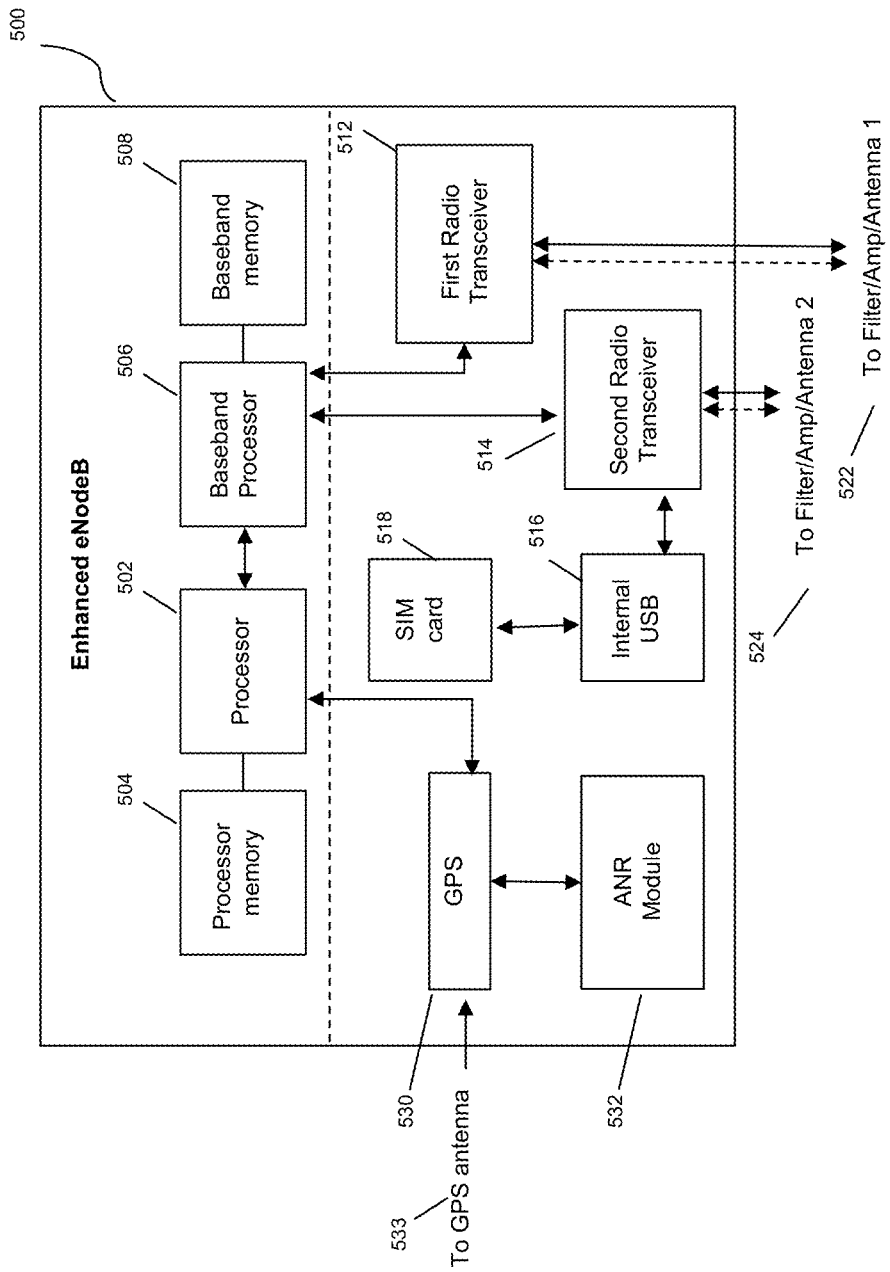
FIG. 5 is an enhanced eNodeB for performing the methods described herein, in accordance with some embodiments.

FIG. 5 is an enhanced eNodeB for performing the methods described herein, in accordance with some embodiments. Mesh network node 500 includes processor 502, processor memory 504 in communication with the processor, baseband processor 506, and baseband processor memory 508 in communication with the baseband processor. Mesh network node 500 also includes first radio transceiver 512 and second radio transceiver 514, internal universal serial bus (USB) port 516, and subscriber information module card (SIM card) 518 coupled to USB port 516. In some embodiments, the second radio transceiver 514 itself is coupled to USB port 516, and communications from the baseband processor is passed through USB port 516. The second radio transceiver is used for wirelessly backhauling eNodeB 500.

Processor 502 and baseband processor 506 are in communication with one another. Processor 502 performs routing functions, and determines if/when a switch in network configuration is needed. Baseband processor 506 generates and receives radio signals for both radio transceivers 512 and 514, based on instructions from processor 502. In some embodiments, processors 502 and 506 are on the same physical logic board. In other embodiments, they are on separate logic boards.

Processor 502 identifies the appropriate network configuration, and performs routing of packets from one network interface to another accordingly. Processor 502 uses memory 504, in particular to store a routing table to be used for routing packets. Baseband processor 506 performs operations to generate the radio frequency signals for transmission or retransmission by both transceivers 510 and 512. Baseband processor 506 also performs operations to decode signals received by transceivers 512 and 514. Baseband processor 506 uses memory 508 to perform these tasks.

The first radio transceiver 512 is a radio transceiver capable of providing LTE eNodeB functionality, and is capable of higher power and multi-channel OFDMA. The second radio transceiver 514 is a radio transceiver capable of providing LTE UE functionality. Both transceivers 512 and 514 are capable of receiving and transmitting on one or more LTE bands. In some embodiments, either or both of transceivers 512 and 514 are capable of providing both LTE eNodeB and LTE UE functionality. Transceiver 512 is coupled to processor 502 via a Peripheral Component Interconnect-Express (PCI-E) bus, and/or via a daughtercard. As transceiver 514 is for providing LTE UE functionality, in effect emulating a user equipment, it is also connected via the same or different PCI-E bus, or by a USB bus, and is also be coupled to SIM card 518. First transceiver 512 is coupled to first radio frequency (RF) chain (filter, amplifier, antenna) 522, and second transceiver 514 is coupled to second RF chain (filter, amplifier, antenna) 524.

SIM card 518 provides information required for authenticating the simulated UE to the evolved packet core (EPC). When no access to an operator EPC is available, a local EPC is used, or another local EPC on the network is used. This information is stored within the SIM card, and includes one or more of an international mobile equipment identity (IMEI), international mobile subscriber identity (IMSI), or other parameter needed to identify a UE. Special parameters are stored in the SIM card or provided by the processor during processing to identify to a target eNodeB that device 500 is not an ordinary UE but instead is a special UE for providing backhaul to device 500.

Wired backhaul or wireless backhaul is used. Wired backhaul is an Ethernet-based backhaul (including Gigabit Ethernet), or a fiber-optic backhaul connection, or a cable-based backhaul connection, in some embodiments. Additionally, wireless backhaul is provided in addition to wireless transceivers 512 and 514, which is Wi-Fi 802.11a/b/g/n/ac/ad/ah, Bluetooth, ZigBee, microwave (including line-of-sight microwave), or another wireless backhaul connection. Any of the wired and wireless connections described herein is used flexibly for either access (providing a network connection to UEs) or backhaul (providing a mesh link or providing a link to a gateway or core network), according to identified network conditions and needs, and is under the control of processor 502 for reconfiguration.

A GPS module 530 is also be included, and is in communication with a GPS antenna 532 for providing GPS coordinates, as described herein. When mounted in a vehicle, the GPS antenna is located on the exterior of the vehicle pointing upward, for receiving signals from overhead without being blocked by the bulk of the vehicle or the skin of the vehicle. Automatic neighbor relations (ANR) module 532 is present and is run on processor 502 or on another processor, or is located within another device, according to the methods and procedures described herein.

Other elements and/or modules are also included, such as a home eNodeB, a local gateway (LGW), a self-organizing network (SON) module, or another module. Additional radio amplifiers, radio transceivers and/or wired network connections are included.

Figure 6:
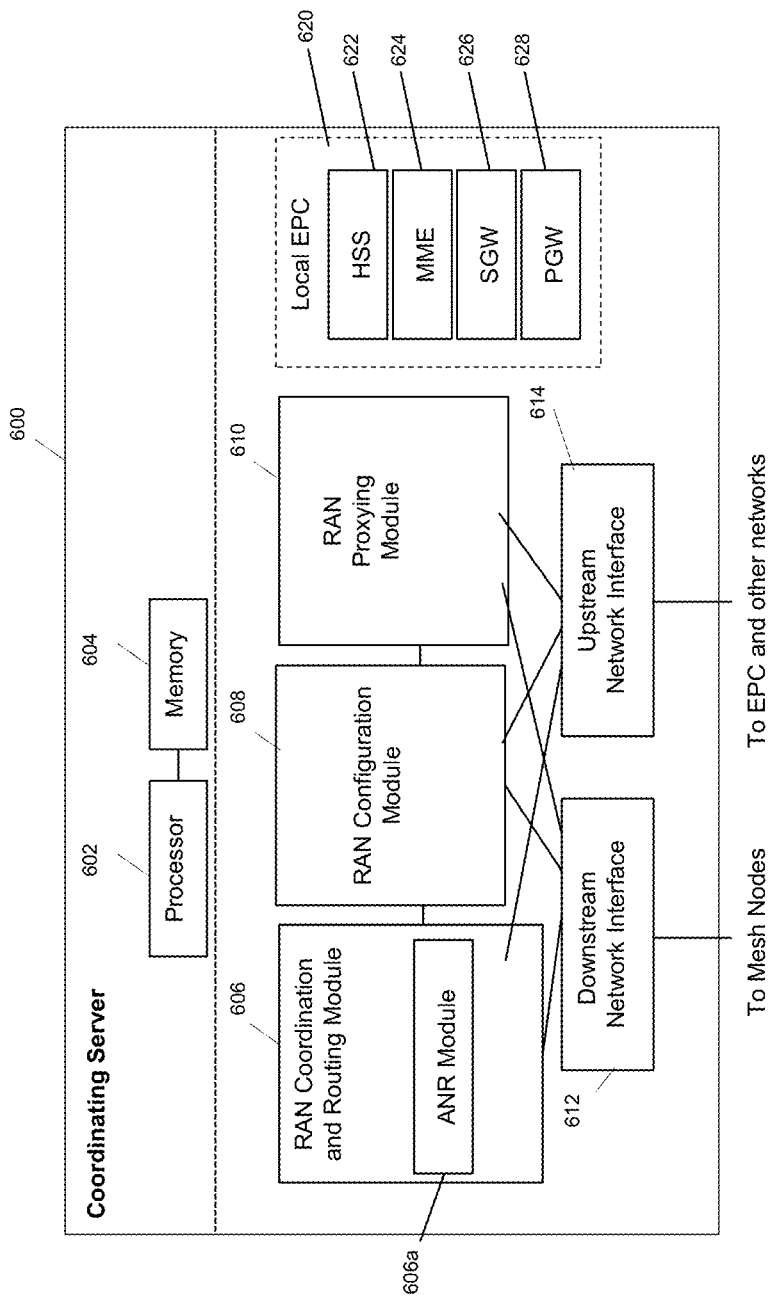
FIG. 6 is a coordinating server for providing services and performing methods as described herein, in accordance with some embodiments.

FIG. 6 is a coordinating server for providing services and performing methods as described herein, in accordance with some embodiments. Coordinating server 600 includes processor 602 and memory 604, which are configured to provide the functions described herein. Also present are radio access network coordination/routing (RAN Coordination and routing) module 606, including ANR module 606a, RAN configuration module 608, and RAN proxying module 610. The ANR module 606a performs the ANR tracking, PCI disambiguation, ECGI requesting, and GPS coalescing and tracking as described herein, in coordination with RAN coordination module 606 (e.g., for requesting ECGIs, etc.). In some embodiments, coordinating server 600 coordinates multiple RANs using coordination module 606. In some embodiments, coordination server also provides proxying, routing virtualization and RAN virtualization, via modules 610 and 608. In some embodiments, a downstream network interface 612 is provided for interfacing with the RANs, which is a radio interface (e.g., LTE), and an upstream network interface 614 is provided for interfacing with the core network, which is either a radio interface (e.g., LTE) or a wired interface (e.g., Ethernet).

Coordinator 600 includes local evolved packet core (EPC) module 620, for authenticating users, storing and caching priority profile information, and performing other EPC-dependent functions when no backhaul link is available. Local EPC 620 includes local HSS 622, local MME 624, local SGW 626, and local PGW 628, as well as other modules. Local EPC 620 incorporates these modules as software modules, processes, or containers. Local EPC 620 alternatively incorporates these modules as a small number of monolithic software processes. Modules 606, 608, 610 and local EPC 620 each run on processor 602 or on another processor, or is located within another device.

In any of the scenarios described herein, where processing is performed at the cell, the processing is performed in coordination with a cloud coordination server. A mesh node is an eNodeB. An eNodeB is in communication with the cloud coordination server via an X2 protocol connection, or another connection. The eNodeB performs inter-cell coordination via the cloud communication server when other cells are in communication with the cloud coordination server. The eNodeB communicates with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, refers to RSSI, RSFP, or any other signal strength indication or parameter.

In some embodiments, the software needed for implementing the methods and procedures described herein are implemented in a high level procedural or an object-oriented language such as C, C++, C#, Python, Java, or Perl. The software is in assembly language if desired. Packet processing implemented in a network device can include any processing determined by the context. For example, packet processing involves high-level data link control (HDLC) framing, header compression, and/or encryption. In some embodiments, software that, when executed, causes a device to perform the methods described herein are stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein are base stations compatible with a Long Term Evolution (LTE) radio transmission protocol or air interface. The LTE-compatible base stations are eNodeBs. In addition to supporting the LTE protocol, the base stations also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein support Wi-Fi air interfaces, which also include one or more of IEEE 802.11a/b/g/n/ac/af/p/h. In some embodiments, the base stations described herein support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein are stored on a computer-readable medium such as a computer memory storage device, a hard disk, a flash drive, an optical disc, or the like. As will be understood by those skilled in the art, the present invention is embodied in other specific forms without departing from the spirit or essential characteristics thereof. For example, wireless network topology can also apply to wired networks, optical networks, and the like. The methods apply to LTE-compatible networks, to UMTS-compatible networks, to 5G networks, or to networks for additional protocols that utilize radio frequency data transmission. Various components in the devices described herein are added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure are made without departing from the spirit and scope of the disclosure, which is limited only by the claims which follow. Various components in the devices described herein are added, removed, or substituted with those having the same or similar functionality. Various steps as described in the figures and specification are added or removed from the processes described herein, and the steps described are performed in an alternative order, consistent with the spirit of the invention. Features of one embodiment are used in another embodiment. Other embodiments are within the following claims.

The invention claimed is:

1. A method of simultaneous Long Term Evolution (LTE) and New Radio (NR) Physical Resource Block (PRB) scheduling in a network, comprising:
   dynamically sharing a subframe of an air interface between LTE service and NR service, including using the subframe as a Multicast Broadcast Single Frequency Network (MBSFN) subframe for the LTE service and also transmitting in the subframe a synchronization signal for the NR service,
   wherein the air interface has standard LTE subframes, and the NR service uses Cell Reference Signal (CRS) rate-matching and additional Physical Downlink Shared Communication Channel (PDSCH) Demodulation Reference Signal (DMRS) position; and
   scheduling the simultaneous LTE and NR PRB within 1 ms granularity, implemented within a Virtual Baseband Unit (VBBU) facilitated via a Heterogeneous Network (HetNet) Gateway (HNG).

2. The method of claim 1, further comprising receiving from a device signaling indicating that the device supports the additional PDSCH DMRS position.

3. The method of claim 2 further comprising configuring the device with a rate-matching parameter for LTE CRS via a Radio Resource Control (RRC) connection.

4. The method of claim 3 further comprising setting a first position of the PDSCH DMRS to symbol 2 or 3 of the subframe.

5. The method of claim 1 further comprising adding a guard-band to support subcarrier spacing (SCS) greater than 15 khz.

6. Non-transitory storage containing instructions for providing simultaneous Long Term Evolution (LTE) and New Radio (NR) Physical Resource Block (PRB) scheduling in a network which, when executed, cause a system to perform steps comprising:
   dynamically sharing a subframe of an air interface between LTE service and NR service, including using the subframe as a Multicast Broadcast Single Frequency Network (MBSFN) subframe for the LTE service and also transmitting in the subframe a synchronization signal for the NR service,
   wherein the air interface has standard LTE subframes, and the NR service uses Cell Reference Signal (CRS) rate-matching and additional Physical Downlink Shared Communication Channel (PDSCH) Demodulation Reference Signal (DMRS) position; and
   scheduling the simultaneous LTE and NR PRB within 1 ms granularity, implemented within a Virtual Baseband Unit (VBBU) facilitated via a Heterogeneous Network (HetNet) Gateway (HNG).

7. The non-transitory storage of claim 6, wherein the steps further comprise receiving from a device signaling indicating that the device supports the additional PDSCH DMRS position.

8. The non-transitory storage of claim 7, wherein the steps further comprise configuring the device with a rate-matching parameter for LTE CRS via a Radio Resource Control (RRC) connection.

9. The non-transitory storage of claim 8, wherein the steps further comprise setting a first position of the PDSCH DMRS to symbol 2 or 3 of the subframe.

10. The non-transitory storage of claim 6, wherein the steps further comprise adding a guard-band to support subcarrier spacing (SCS) greater than 15 khz.

11. A system for providing simultaneous Long Term Evolution (LTE) and New Radio (NR) Physical Resource Block (PRB) scheduling in a network, comprising:
    at least one processor;
    non-transitory data storage;
    instructions stored in the non-transitory data storage and executable by the at least one processor to carry out operations including:
      dynamically sharing a subframe of an air interface between LTE service and NR service, including using the subframe as a Multicast Broadcast Single Frequency Network (MBSFN) subframe for the LTE service and also transmitting in the subframe a synchronization signal for the NR service,
      wherein the air interface has standard LTE subframes, and the NR service uses Cell Reference Signal (CRS) rate-matching and additional Physical Downlink Shared Communication Channel (PDSCH) Demodulation Reference Signal (DMRS) position; and
      scheduling the simultaneous LTE and NR PRB within 1 ms granularity, implemented within a Virtual Baseband Unit (VBBU) facilitated via a Heterogeneous Network (HetNet) Gateway (HNG).

12. The system of claim 11 wherein the operations further include receiving from a device signaling indicating that the device supports the additional PDSCH DMRS position.

13. The system of claim 12 further comprising the network device configured with a rate-matching parameter for LTE CRS via a Radio Resource Control (RRC) connection.

14. The system of claim 13, wherein the operations further include setting a first position of the PDSCH DMRS to symbol 2 or 3 of the subframe.

15. The system of claim 11, wherein the operations further include adding a guard-band to support subcarrier spacing (SCS) greater than 15 khz.

* * * * *